(12) United States Patent
Ossig et al.

(10) Patent No.: US 8,719,474 B2
(45) Date of Patent: May 6, 2014

(54) INTERFACE FOR COMMUNICATION BETWEEN INTERNAL AND EXTERNAL DEVICES

(75) Inventors: Martin Ossig, Tamm (DE); Reinhard Becker, Ludwigsburg (DE); Andreas Ditte, Ludwigsburg (DE)

(73) Assignee: Faro Technologies, Inc., Lake Mary, FL (US)

( * ) Notice: Subject to any disclaimer, the term of this patent is extended or adjusted under 35 U.S.C. 154(b) by 77 days.

(21) Appl. No.: 13/000,215

(22) PCT Filed: Dec. 19, 2009

(86) PCT No.: PCT/EP2009/009174
§ 371 (c)(1),
(2), (4) Date: Dec. 20, 2010

(87) PCT Pub. No.: WO2010/091710
PCT Pub. Date: Aug. 19, 2010

(65) Prior Publication Data
US 2011/0113170 A1 May 12, 2011

(30) Foreign Application Priority Data
Feb. 13, 2009 (DE) .................. 10 2009 010 465

(51) Int. Cl.
*G06F 13/00* (2006.01)
*G06F 9/44* (2006.01)
(52) U.S. Cl.
CPC .................. *G06F 9/4411* (2013.01)
USPC ............. 710/104; 710/105; 710/110; 710/61
(58) Field of Classification Search
CPC .... G06F 9/4411; G06F 13/364; G06F 13/423
USPC .......... 710/104–110, 300–317, 62–64, 8–19, 710/58–61
See application file for complete search history.

(56) References Cited

U.S. PATENT DOCUMENTS

| | | | |
|---|---|---|---|
| 3,830,567 | A | 8/1974 | Riegl |
| 3,899,145 | A | 8/1975 | Stephenson |
| 3,945,729 | A | 3/1976 | Rosen |
| 4,733,961 | A | 3/1988 | Mooney |
| 4,736,218 | A | 4/1988 | Kutman |

(Continued)

FOREIGN PATENT DOCUMENTS

| | | |
|---|---|---|
| AT | 508635 A1 | 3/2011 |
| AU | 2005200937 A1 | 9/2006 |

(Continued)

OTHER PUBLICATIONS

International Preliminary Report on Patentability and Written Opinion for Application No. PCT/EP2004/014605; Date of Issue Aug. 29, 2006.

(Continued)

*Primary Examiner* — Raymond Phan
(74) *Attorney, Agent, or Firm* — Cantor Colburn LLP

(57) ABSTRACT

An interface, for communication between an internal device and an external device, includes two bus lines of a bus for bidirectional data transfer and at least a first control line, by means of which a control signal can be transferred from the external device to the internal device.

10 Claims, 2 Drawing Sheets

(56) References Cited

U.S. PATENT DOCUMENTS

| | | | |
|---|---|---|---|
| 4,984,881 A | 1/1991 | Osada et al. |
| 5,155,684 A | 10/1992 | Burke et al. |
| 5,218,427 A | 6/1993 | Koch |
| 5,313,261 A | 5/1994 | Leatham et al. |
| 5,329,347 A | 7/1994 | Wallace et al. |
| 5,329,467 A | 7/1994 | Nagamune et al. |
| 5,371,347 A | 12/1994 | Plesko |
| 5,402,365 A | 3/1995 | Kozikaro et al. |
| 5,446,846 A | 8/1995 | Lennartsson |
| 5,517,297 A | 5/1996 | Stenton |
| 5,629,756 A | 5/1997 | Kitajima |
| 5,675,326 A | 10/1997 | Juds et al. |
| 5,677,760 A | 10/1997 | Mikami et al. |
| 5,734,417 A | 3/1998 | Yamamoto et al. |
| 5,745,225 A | 4/1998 | Watanabe et al. |
| 5,793,993 A * | 8/1998 | Broedner et al. ............ 710/106 |
| 5,894,123 A | 4/1999 | Ohtomo et al. |
| 5,898,490 A | 4/1999 | Ohtomo et al. |
| 5,933,267 A | 8/1999 | Ishizuka |
| 5,936,721 A | 8/1999 | Ohtomo et al. |
| 5,940,181 A | 8/1999 | Tsubono et al. |
| 5,988,862 A | 11/1999 | Kacyra et al. |
| 6,040,898 A | 3/2000 | Mrosik et al. |
| 6,069,700 A | 5/2000 | Rudnick et al. |
| 6,077,306 A | 6/2000 | Metzger |
| 6,149,112 A | 11/2000 | Thieltges |
| 6,349,249 B1 | 2/2002 | Cunningham |
| 6,445,446 B1 | 9/2002 | Kumagai et al. |
| 6,480,270 B1 | 11/2002 | Studnicka et al. |
| 6,483,106 B1 | 11/2002 | Ohtomo et al. |
| 6,504,602 B1 | 1/2003 | Hinderling |
| 6,512,575 B1 | 1/2003 | Marchi |
| 6,650,402 B2 | 11/2003 | Sullivan et al. |
| 6,675,122 B1 | 1/2004 | Markendorf et al. |
| 6,710,859 B2 | 3/2004 | Shirai et al. |
| 6,750,873 B1 | 6/2004 | Bernardini et al. |
| 6,825,923 B2 | 11/2004 | Hamar et al. |
| 6,856,381 B2 | 2/2005 | Christoph |
| 6,917,415 B2 | 7/2005 | Gogolla et al. |
| 6,965,843 B2 | 11/2005 | Raab et al. |
| 7,029,126 B2 | 4/2006 | Tang |
| 7,069,124 B1 | 6/2006 | Whittaker et al. |
| 7,076,420 B1 | 7/2006 | Snyder et al. |
| 7,127,822 B2 | 10/2006 | Kumagai et al. |
| 7,140,213 B2 | 11/2006 | Feucht et al. |
| 7,190,465 B2 | 3/2007 | Froehlich et al. |
| 7,193,690 B2 | 3/2007 | Ossig et al. |
| 7,285,793 B2 | 10/2007 | Husted |
| 7,430,068 B2 | 9/2008 | Becker et al. |
| 7,541,830 B2 * | 6/2009 | Fahrbach et al. ............ 326/30 |
| 7,659,995 B2 | 2/2010 | Knighton et al. |
| 7,733,544 B2 | 6/2010 | Becker et al. |
| 7,834,985 B2 | 11/2010 | Morcom |
| 7,847,922 B2 | 12/2010 | Gittinger et al. |
| 7,869,005 B2 | 1/2011 | Ossig et al. |
| 7,900,714 B2 | 3/2011 | Milbourne et al. |
| 7,935,928 B2 * | 5/2011 | Seger et al. ............ 250/330 |
| 7,994,465 B1 | 8/2011 | Bamji et al. |
| 7,995,834 B1 | 8/2011 | Knighton et al. |
| 8,020,657 B2 * | 9/2011 | Allard et al. ............ 180/167 |
| 8,117,668 B2 | 2/2012 | Crampton et al. |
| 8,152,071 B2 | 4/2012 | Doherty et al. |
| 8,269,984 B2 | 9/2012 | Hinderling et al. |
| 8,310,653 B2 | 11/2012 | Ogawa et al. |
| 8,384,914 B2 | 2/2013 | Becker et al. |
| 2002/0059042 A1 | 5/2002 | Kacyra et al. |
| 2002/0143506 A1 | 10/2002 | D'Aligny et al. |
| 2002/0149694 A1 | 10/2002 | Seo |
| 2002/0176097 A1 | 11/2002 | Rodgers |
| 2003/0043386 A1 | 3/2003 | Froehlich et al. |
| 2003/0090646 A1 | 5/2003 | Riegl et al. |
| 2003/0137449 A1 | 7/2003 | Vashisth et al. |
| 2003/0179361 A1 | 9/2003 | Ohtomo et al. |
| 2004/0004727 A1 | 1/2004 | Yanagisawa et al. |
| 2004/0027554 A1 | 2/2004 | Ishinabe et al. |
| 2004/0135990 A1 | 7/2004 | Ohtomo et al. |
| 2004/0158355 A1 | 8/2004 | Holmqvist et al. |
| 2004/0179570 A1 | 9/2004 | Vitruk et al. |
| 2004/0221790 A1 | 11/2004 | Sinclair et al. |
| 2004/0246462 A1 | 12/2004 | Kaneko et al. |
| 2005/0046823 A1 | 3/2005 | Ando et al. |
| 2005/0111514 A1 | 5/2005 | Matsumoto et al. |
| 2005/0141052 A1 | 6/2005 | Becker et al. |
| 2005/0172503 A1 | 8/2005 | Kumagai et al. |
| 2005/0190384 A1 | 9/2005 | Persi et al. |
| 2006/0061566 A1 | 3/2006 | Verma et al. |
| 2006/0088044 A1 | 4/2006 | Hammerl |
| 2006/0109536 A1 | 5/2006 | Mettenleiter et al. |
| 2006/0193521 A1 | 8/2006 | England, III et al. |
| 2006/0241791 A1 * | 10/2006 | Pokorny et al. ............ 700/67 |
| 2007/0058154 A1 | 3/2007 | Reichert et al. |
| 2007/0064976 A1 | 3/2007 | England, III |
| 2007/0100498 A1 | 5/2007 | Matsumoto et al. |
| 2007/0118269 A1 | 5/2007 | Gibson et al. |
| 2007/0122250 A1 | 5/2007 | Mullner |
| 2007/0150111 A1 | 6/2007 | Wu et al. |
| 2007/0171394 A1 | 7/2007 | Steiner et al. |
| 2007/0181685 A1 | 8/2007 | Zhu et al. |
| 2007/0229929 A1 | 10/2007 | Soreide et al. |
| 2008/0052808 A1 | 3/2008 | Leick et al. |
| 2008/0075326 A1 | 3/2008 | Otani et al. |
| 2008/0154538 A1 | 6/2008 | Stathis |
| 2008/0273758 A1 | 11/2008 | Fuchs et al. |
| 2008/0309546 A1 | 12/2008 | Wakayama et al. |
| 2009/0021351 A1 | 1/2009 | Beniyama et al. |
| 2009/0046752 A1 | 2/2009 | Bueche et al. |
| 2009/0051938 A1 | 2/2009 | Miousset et al. |
| 2009/0095047 A1 | 4/2009 | Patel et al. |
| 2009/0100949 A1 | 4/2009 | Shirai et al. |
| 2009/0133494 A1 | 5/2009 | Van Dam et al. |
| 2009/0161091 A1 | 6/2009 | Yamamoto |
| 2009/0323742 A1 | 12/2009 | Kumano |
| 2010/0030421 A1 * | 2/2010 | Yoshimura et al. ............ 701/29 |
| 2010/0049891 A1 * | 2/2010 | Hartwich et al. ............ 710/110 |
| 2010/0134596 A1 | 6/2010 | Becker |
| 2010/0195086 A1 | 8/2010 | Ossig et al. |
| 2010/0277472 A1 | 11/2010 | Kaltenbach et al. |
| 2011/0025905 A1 | 2/2011 | Tanaka |
| 2011/0066781 A1 * | 3/2011 | Debelak et al. ............ 710/110 |
| 2012/0035788 A1 | 2/2012 | Trepagnier et al. |
| 2012/0035798 A1 | 2/2012 | Barfoot et al. |
| 2012/0046820 A1 * | 2/2012 | Allard et al. ............ 701/25 |
| 2012/0154786 A1 | 6/2012 | Gosch et al. |
| 2012/0169876 A1 * | 7/2012 | Reichert et al. ............ 348/148 |

FOREIGN PATENT DOCUMENTS

| | | |
|---|---|---|
| CN | 1735789 | 2/2006 |
| CN | 1838102 A | 9/2006 |
| DE | 2216765 A1 | 4/1972 |
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 4445464 A1 | 7/1995 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10137241 A1 | 9/2002 |
| DE | 10232028 | 2/2004 |
| DE | 10336458 A1 | 2/2004 |
| DE | 10244643 A1 | 4/2004 |
| DE | 20320216 U1 | 4/2004 |
| DE | 10304188 A1 | 8/2004 |
| DE | 10361870 A | 7/2005 |
| DE | 102004015111 A1 | 10/2005 |
| DE | 102004028090 A1 | 12/2005 |
| DE | 202006005643 U1 | 8/2006 |
| DE | 102005056265 A1 | 5/2007 |

(56) References Cited

FOREIGN PATENT DOCUMENTS

| | | |
|---|---|---|
| DE | 102006053611 A1 | 5/2007 |
| DE | 102006024534 A1 | 11/2007 |
| DE | 102007037162 A1 | 2/2009 |
| DE | 102008014274 A1 | 8/2009 |
| DE | 102009035336 B3 | 11/2010 |
| DE | 102010032726 B3 | 11/2011 |
| DE | 102010032725 A1 | 1/2012 |
| DE | 202011051975 U1 | 2/2013 |
| DE | 102012107544 B3 | 5/2013 |
| EP | 0667549 A2 | 8/1995 |
| EP | 0727642 A1 | 8/1996 |
| EP | 0838696 A1 | 4/1998 |
| EP | 0949524 A1 | 10/1999 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 1112941 | 5/1968 |
| GB | 2222695 A | 3/1990 |
| GB | 2336493 A | 10/1999 |
| GB | 2388661 A | 11/2003 |
| GB | 2447258 A | 9/2008 |
| JP | H0357911 A | 3/1991 |
| JP | H04115108 A | 4/1992 |
| JP | H04267214 A | 9/1992 |
| JP | H0572477 A | 3/1993 |
| JP | 07128051 A | 5/1995 |
| JP | H07229963 A | 8/1995 |
| JP | 0815413 A | 1/1996 |
| JP | 0821714 A | 1/1996 |
| JP | H08129145 A | 5/1996 |
| JP | H08136849 A | 5/1996 |
| JP | H08262140 A | 10/1996 |
| JP | 1123993 A | 1/1999 |
| JP | 2000121724 A | 4/2000 |
| JP | 2000249546 A | 9/2000 |
| JP | 2000339468 A | 12/2000 |
| JP | 2001337278 A | 12/2001 |
| JP | 2003050128 A | 2/2003 |
| JP | 2003156330 | 5/2003 |
| JP | 2003156562 A | 5/2003 |
| JP | 2003202215 A | 7/2003 |
| JP | 2004109106 A | 4/2004 |
| JP | 2004245832 A | 9/2004 |
| JP | 2004348575 A | 12/2004 |
| JP | 2005055226 A | 3/2005 |
| JP | 2005069700 A | 3/2005 |
| JP | 2005215917 A | 8/2005 |
| JP | 2006038683 A | 2/2006 |
| JP | 2007178943 A | 7/2007 |
| JP | 2008076303 A | 4/2008 |
| JP | 2008082707 A | 4/2008 |
| JP | 2008096123 A | 4/2008 |
| JP | 2008107286 A | 5/2008 |
| JP | 2009063339 A | 3/2009 |
| JP | 2009541758 A | 11/2009 |
| JP | 2010169405 A | 8/2010 |
| WO | 89/05512 | 6/1989 |
| WO | 97/11399 | 3/1997 |
| WO | 0020880 A2 | 4/2000 |
| WO | 0063681 | 10/2000 |
| WO | 02084327 A2 | 10/2002 |
| WO | 2005008271 A2 | 1/2005 |
| WO | 2005059473 A2 | 6/2005 |
| WO | 2006000552 A1 | 1/2006 |
| WO | 2007012198 A1 | 2/2007 |
| WO | 2007051972 A1 | 5/2007 |
| WO | 2007087198 A1 | 8/2007 |
| WO | 2007118478 A1 | 10/2007 |
| WO | 2008019856 A1 | 2/2008 |
| WO | 2008068791 A1 | 6/2008 |
| WO | 2009053085 A1 | 4/2009 |
| WO | 2009123278 A1 | 10/2009 |
| WO | 2012061122 A1 | 5/2012 |
| WO | 2012013525 A2 | 8/2012 |
| WO | 2012103525 A2 | 8/2012 |

OTHER PUBLICATIONS

International Search Report for International Application No. PCT/EP2007/005789; mailing date Oct. 30, 2007.

International Search Report for International Patent Application PCT/EP2004/014605; mailing date Apr. 15, 2005.

Bouvet, D., et al., "Precise 3-D Localization by Automatic Laser Theodolite and Odometer for Civil-Engineering Machines", Proceedings of the 2001 IEEE International Conference on Robotics and Automation. ICRA 2001. Seoul, Korea, May 21-26, 2001; IEEE, US., vol. 2, May 21, 2001, pp. 2045-2050, XP010550445, DOI: 10.1109/ROBOT.2001.932908 ISBN: 978-0-7803-6576-6, the whole document.

International Search Report of the International Searching Authority for Application No. PCT/EP2011/003261; Date of Mailing Oct. 17, 2011.

International Search Report of the International Searching Authority for Application No. PCT/EP2011/003263; Date of Mailing Oct. 19, 2011.

International Search Report of the International Searching Authority for Application No. PCT/EP2011/003264; Date of Mailing Oct. 19, 2011.

Leica Geosystems: "Leica Rugby 55 Designed for Interior Built for Construction", Jan. 1, 2009, XP002660558, Retrieved from the Internet: URL:http://www.leica-geosystems.com/downloads123/zz/lasers/Rugby%2055/brochures/Leica_Rugby_55_brochure_en.pdf [retrieved on Oct. 5, 2011] the whole document.

International Search Report for PCT/EP2009/009174 and Written Opinion of the International Searching Authority; mailing date May 25, 2010.

iQsun Laserscanner Brochure, 2 Pages, Apr. 2005.

International Preliminary Report on Patentability and Written Opinion for PCT/EP2009/050888; Date of Issuance Sep. 7, 2010.

International Search Report of the International Searching Authority for PCT/EP2010/006867; Date of Mailing Mar. 18, 2011.

International Search Report of the International Searching Authority for PCT/EP2009/050888; Date of Mailing Sep. 15, 2009.

International Search Report of the International Searching Authority for PCT/EP2010/006866; Date of Mailing Mar. 14, 2011.

International Search Report of the International Searching Authority for PCT/EP2010/006868; Date of Mailing Mar. 14, 2011.

International Search Report of the International Searching Authority for PCT/IB2010/002216; Date of Mailing Feb. 3, 2011.

International Search Report of the International Searching Authority for PCT/EP2009/050887; Date of Mailing May 14, 2009.

Jasiobedzki, Piotr, "Laser Eye—A New 3D Sensor for Active Vision", SPIE—Sensor Fusion VI, vol. 2059, Sep. 7, 1993, pp. 316-321, XP00262856, Boston, U.S.A., Retrieved from the Internet: URL:http://scitation.aip.org/getpdf/servlet/GetPDFServlet?filetype=pdf&id=PSISDG002059000001000316000001&idtype=cvips&doi=10.117/12.150236&prog=normal>[retrieved on Mar. 8, 2011] the whole document.

Written Opinion of the International Searching Authority for International Patent Application PCT/EP2010/006867; mailing date Mar. 18, 2011.

WO 00/26612 is the published equivalent of DE 19850118. Published May 11, 2000.

Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.

Bornaz, L., et al., Multiple Scan Registration in Lidar Close-Range Applications, The International Archives of the Photogrammetry, Remote Sensing and Spatial Information Sciences, vol. XXXIV, Part 5/W12, Jul. 2003, pp. 72-77, XP002590306.

(56) References Cited

OTHER PUBLICATIONS

Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
Chinese Publication No. CN 1445509, published Oct. 1, 2003—English Abstract Not Available; EP Equivalent 1347267.
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP002587995, Proceedings of the SPIE.
Godin, G., et al., A Method for the Registration of Attributed Range Images, Copyright 2001, [Retrieved on Jan. 18, 2010 at 03:29 from IEEE Xplore].
International Preliminary Report on Patentability and Written Opinion for PCT/IB2010/002216; Date of Issuance Jan. 24, 2012.
International Preliminary Report on Patentability and Written Opinion for Application No. PCT/EP2009/050887; Date of Issue Sep. 7, 2010.
International Preliminary Report on Patentability and Written Opinion for International Patent Application PCT/IB2010/002226; Date of Issuance Jan. 24, 2012.
International Preliminary Report on Patentability and Written Opinion for International Application No. PCT/EP2007/005789; Date of Issue Jan. 6, 2009.
International Search Report for International Patent Application PCT/IB2010/002226; mailing date Dec. 13, 2010.
International Search Report for International Application No. PCT/EP2006/003010 mailed Nov. 12, 2006.
International Search Report for International Patent Application PCT/EP2010/001779; mailing date Jul. 20, 2010.
International Search Report for International Patent Application PCT/EP2010/001780; mailing date Jul. 23, 2010.
International Search Report for International Patent Application PCT/EP2010/001781; mailing date Jul. 22, 2010.
International Search Report for PCT/IB2010/002258. Date of Mailing Jan. 28, 2011.
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Williams, J.A., et al., Evaluation of a Novel Multiple Point Set Registration Algorithm, Copyright 2000, [Retrieved on Jan. 18, 2010 at 04:10 from IEEE Xplore].
International Search Report of the International Searching Authority for Application No. PCT/EP2011/001662; Date of Mailing May 26, 2011.
Written Opinion of the International Searching Authority for Application No. PCT/EP2011/001662; Date of Mailing May 26, 2011.
Merriam-Webster (m-w.com), "Interface". 2012. http://www.merriam-webster.com/dictionary/interface.
Merriam-Webster (m-w.com), "Traverse". 2012. http://www.merriam-webster.com/dictionary/traverse.
Merriam-Webster (m-w.com), "Parts". 2012. http://www.merriam-webster.com/dictionary/parts.
International Preliminary Report on Patentability for International Application Serial No. PCT/EP2011/003261. International filing date Jul. 1, 2011. Date of Issuance Jan. 29, 2013.
International Preliminary Report on Patentability for International Application Serial No. PCT/EP2011/003262. International filing date Jul. 1, 2011. Date of Issuance Jan. 29, 2013.
International Preliminary Report on Patentability for International Application Serial No. PCT/EP2011/003263. International filing date Jul. 1, 2011. Date of Issuance Jan. 29, 2013.
International Preliminary Report on Patentability for International Application Serial No. PCT/EP2011/003264. International filing date Jul. 1, 2011. Date of Issuance Jan. 29, 2013.
Akca, Devrim, Full Automated Registration of Laser Scanner Point Clouds, Institute of Geodesy and Photogrammetry, Swiss Federal Institute of Technology, Zuerich, Switzerland; Published Dec. 2003.
First Office Action and Search Report with English Translation for Chinese Patent Application No. 201080003456.3; Issue Date Jan. 17, 2013.
First Chinese Office Action for Application No. 201080003467.1; Office Action Issue Date Feb. 5, 2013; (translated).
Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on-line], Downloaded From: http://proceedings.spiedigitallibrary.org/on Jan. 26, 2013.
International Search Report of the International Searching Authority for Application No. PCT/US2012/075178; Date of Mailing Apr. 9, 2013.
"Scanner Basis Configuration for Riegl VQ-250", Riegl Company Webpage, Feb. 16, 2011, XP002693900, Retrieved from the internet: URL:http://www.riegl.com/uploads/tx_pxpriegldownloads/30_SystemConfiguration_VQ-250_02-11_16-02-2011.pdf [retrieved on Mar. 15, 2003] the whole document.
Written Opinion of the International Searching Authority for Application No. PCT/US2012/075178; Date of Mailing Apr. 9, 2013.
GB Examination Report dated Mar. 27, 2013 for GB Application No. GB1303390.7.
GB Examination Report dated Mar. 27, 2013 for GB Application No. GB1303382.4.
Chinese Notification of First Office Action for Chinese Application No. 201080003463.3; Issued Oct. 30, 2012 (translated).
First Chinese Office Action for Chinese Patent Applicaiton No. 2013082200801190; Dated Aug. 27, 2013.
Second Office Action with English Translation for Chinese Patent Application No. 201080003466.7; Issue Date Jul. 19, 2013.
German Office Action for DE Application Serial No. 102012109481.0; Dated Aug. 1, 2013.
Germany Office Action for DE Application No. 10 2012 107 544.1; Issued Jan. 2, 2013.
GB Examination Report dated Jun. 19, 2013 for GB Application No. GB1202398.2.
GB Examination Report dated Aug. 15, 2013 for GB Application No. GB 1303382.4.
GB Examination Report dated Aug. 7, 2013 for GB Application No. GB1303390.7.
International Search Report of the International Searching Authority for Application No. PCT/EP2011/003262; Date of Mailing Sep. 30, 2011.
Japanese Office Action for JP Application No. 2012-534589; Issued Jul. 30, 2013.
Japanese Office Action for Application Serial No. 2013-520987; Date of Mailing Jul. 2, 2013.
Japanese Office Action for Application Serial No. 2013-520989; Date of Mailing Jul. 2, 2013.
Japanese Office Action for Application Serial No. 2012-534590; Date of Mailing Jul. 30, 2013.
Japanese Office Action for JP Application Serial No. 2012-501175; Date of Mailing Jul. 16, 2013.
Japanese Office Action for Japanese Patent Application No. 2012501176; Dated Aug. 27, 2013.
Japanese Office Action for Japanese Patent Application No. 2012-534588; Date of Mailing Sep. 17, 2013.
Japanese Office Action for JP Application Serial No. 2013-520990; Dated Jul. 2, 2013.
German Office Acton for DE Application No. 102013102.554.4; Dated Jan. 9, 2014.
Second German Office Action for DE Application Serial No. 10 2009 015 922.3; Dated Dec. 2, 2013.

(56) References Cited

OTHER PUBLICATIONS

GB Exam and Search Report for Application No. GB1314371.4; Dated Nov. 22, 2013.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Second JP Office Action for JP Patent Application Serial No. 2012-534590; Date of Mailing Nov. 12, 2013.
Japanese Office Action for JP Patent Application Serial No. 2012-501174; Dated Oct. 29, 2013.
Chinese Office Action for Chinese Application Serial No. 201080047516-1; Date of Issue Apr. 1, 2013.

* cited by examiner

INTERFACE FOR COMMUNICATION BETWEEN INTERNAL AND EXTERNAL DEVICES

CROSS-REFERENCE TO RELATED APPLICATIONS

The present application is a National Stage Application of PCT Application No. PCT/EP2009/009174 filed on Dec. 19, 2009, which claims the benefit of German Patent Application No. DE 10 2009 010 465.8, filed on Feb. 13, 2009, which are hereby incorporated by reference.

BACKGROUND OF THE INVENTION

The invention relates to an interface for communication between an internal device and an external device.

By means of a laser scanner such as is known for example from U.S. Pat. No. 7,430,068, the surroundings of the laser scanner can be optically scanned and measured. The laser scanner can be constructed with a stationary base, for example in order to measure a closed space, or be mounted on a carriage, for example in order to measure a tunnel. In the latter case, the carriage moves through the tunnel, thus resulting in helical scanning. The data of the laser scanner are combined during evaluation with the data about the linear movement of the carriage, which are detected for example by a device which is an external device with respect to the laser scanner functioning as an internal device.

SUMMARY OF THE INVENTION

Embodiments of the present invention are intent on improving an interface of the type mentioned hereinabove.

The interface according to embodiments of the present invention makes it possible to synchronize the data of the internal device with the data of the external device by means of control signals. In order not only to utilize the high speed of the control signals but also to provide the latter with greater information, the control signal is assigned an identification sequence, which is transmitted via the bus and which assigns the control signal to a specific event. Then, the identification sequence may be transmitted and stored at the same time or in a temporally offset manner, i.e., in a preceding or succeeding (time-delayed) mode, with respect to the control signal. It is also possible to define an operation mode beforehand by means of an identification sequence passed on a bus. In order to avoid collisions of the control signals, one respective control line per direction may be provided between the internal device and the external device, while the bus can be used bidirectionally. As the bus, a CAN bus has the advantage that the interface needs only two bus lines. However, other bus systems (USB or the like) are also possible, if appropriate with more than two bus lines. A power supply and a ground in the interface permit connection of smaller external devices without a dedicated power supply.

The internal device may be a portable 3D-measuring instrument, in particular a laser scanner that can optically scan and measure its surroundings.

The external device may be any device which supplies data which are intended to be synchronized expediently with the data of the internal device. If the internal device is a laser scanner, the external device supplies supplementary data, for example non-optical data or data concerning a movement of the laser scanner.

If the laser scanner is mounted on a carriage, the external device can detect the (linear) movement of the carriage. The carriage can travel in an open area or in a closed space, for example a long hall or a tunnel In the open area, the external device can be a GPS receiver. The carriage can travel on rails or on a road. Areas of application are road mapping or tunnel inspection. Thus, an inspection train can travel on a mountain section of railway line with a large number of tunnels, which inspection train travels automatically, for example, and examines the rails for fallen rocks and the tunnel walls for cracks.

BRIEF DESCRIPTION OF THE DRAWINGS

The invention is explained in more detail below on the basis of exemplary embodiments illustrated in the drawings, in which.

DETAILED DESCRIPTION OF THE INVENTION

Figure 2:
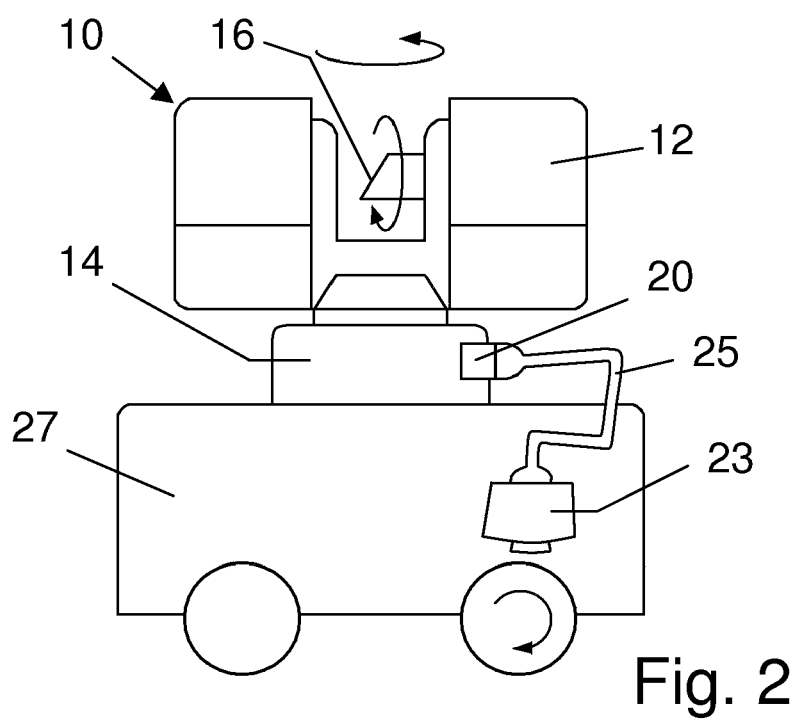
FIG. 2 shows a schematic illustration of a laser scanner mounted on a carriage, with an interface according to embodiments of the present invention.
Figure 3:
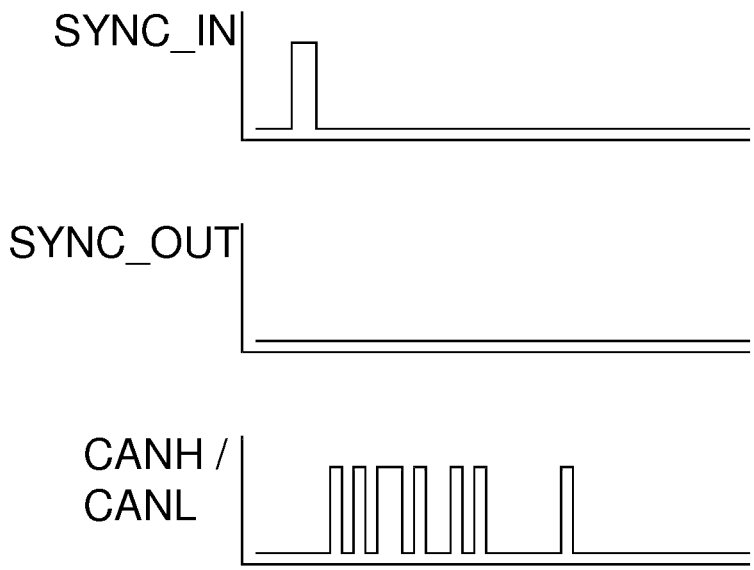
FIG. 3 shows a temporal sequence of a control signal on the first control line and the identification sequence of the control signal on the CAN bus.
Figure 4:
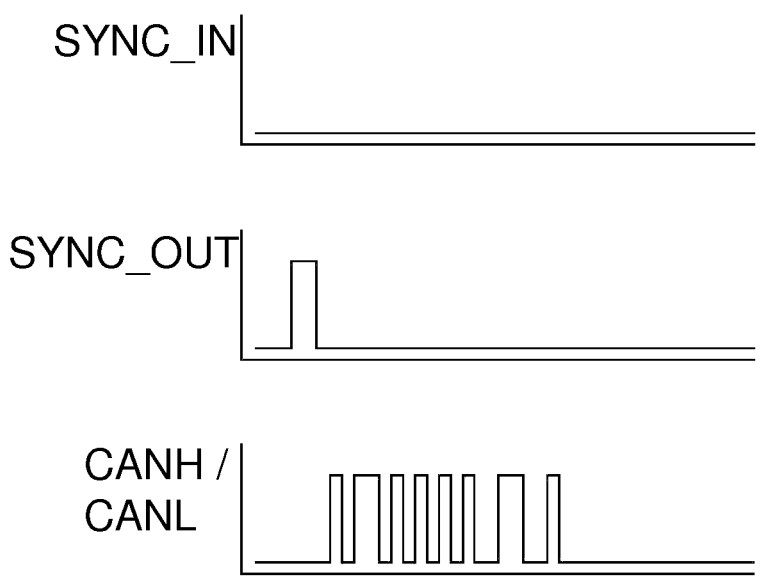
FIG. 4 shows a temporal sequence of a control signal on the second control line and the identification sequence of the control signal on the CAN bus.

Referring to FIG. 2, a laser scanner 10 is provided as a device for optically scanning and measuring surroundings of the laser scanner 10. The laser scanner 10 has a measuring head 12 and a base 14. The measuring head 12 is mounted on the base 14 as a unit that can be rotated about a vertical axis. The measuring head 12 has a mirror 16, which can be rotated about a horizontal axis and by means of which a laser beam is emitted into the surroundings and a reflected signal is received. Further details of the measuring head 12 are described for example in U.S. Pat. Nos. 7,193,690 and 7,430,068, the respective disclosure of each being incorporated by reference. The base 14 defines the stationary reference system of the laser scanner 10. An interface 20 is provided at the laser scanner 10, for example, at the base 14, which interface can be integrated into the base 14 structurally, for example.

Figure 1:
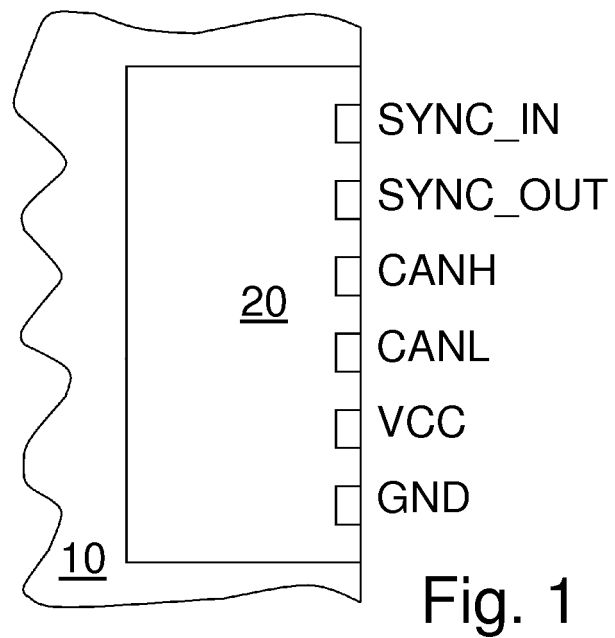
FIG. 1 shows a basic illustration of the interface.

The interface 20 serves for the communication of the laser scanner 10 as an internal device with an external device 23. In addition to the hardware, the interface 20 is also assigned a communication protocol. Referring to FIG. 1, in the exemplary embodiment, the interface 20 has six terminals, namely two bus lines CANH (high) and CANL (low) of a CAN bus, a first control line SYNC_IN, a second control line SYNC_OUT, a power supply line VCC and a ground GND. The CAN bus is known from the automotive sector and specified correspondingly. The two bus lines CANH and CANL are used bidirectionally for data transfer. A differential data transfer is utilized in order to increase the transfer speed.

The two control lines SYNC_N and SYNC_OUT are used unidirectionally for data transfer. On the first control line SYNC_IN, the laser scanner 10 can receive a control signal (SYNC) from the external device. On the second control line SYNC_OUT, the laser scanner 10 outputs a control signal (SYNC) to the external device 23. The external device 23, if it does not have a dedicated power supply, can be connected to the power supply line VCC (5V and up to 500 mA). The ground GND can be used not only for the power supply but also for the CAN bus and for screening. The interface 20 at the laser scanner 10 may be embodied as a socket into which the plug of a cable 25 can be inserted. The cable 25 is then inserted into a corresponding interface 20 of the external device 23 at the other end.

In accordance with one exemplary operation mode, the external device 23 passes a control signal onto the first control line SYNC_N of the interface 20 of the laser scanner 10 at specific points in time. The laser scanner 10 passes the received control signal into its data stream in real time, whereby it is stored with the data stream. The control signal is followed (or announced) by an identification sequence which is assigned to the control signal and which the external device 23 outputs near-instantaneously (but if appropriate in time-delayed fashion) with respect to the control signal via the CAN bus CANH, CANL. The identification sequence contains the information as to what event the control signal represents. The event can be the transfer of a measured value, for example a distance, an angle or a grey level, or a status message of the external device 23. There are no restrictions in respect of this. The laser scanner 10 likewise passes the identification sequence received (if appropriate in time-delayed fashion) into its data stream (if appropriate in time-delayed fashion), whereby it is stored with the data stream. During the evaluation of the data, it is then possible, by means of the identification sequence, for the control signal to be identified and synchronized with the data received from the measuring head 12.

The laser scanner 10 can correspondingly pass a control signal onto the second control line SYNC_OUT of the interface 20 of the laser scanner 10 at specific points in time, for example if the mirror 16 projects the laser beam towards the measuring head 12 or if other specific positions of the measuring head 12 are attained. The external device 23 receives this control signal via the cable 25. The control signal is again followed by an identification sequence, which the laser scanner 10 outputs (if appropriate in time-delayed manner) via the CAN bus CANH, CANL. The identification sequence again contains the information as to what event the control signal represents, such that the external device 23 can identify the control signal and use it for synchronizing its data.

The operation mode described, in which the identification sequence follows the control signal, is particularly advantageous if a measurement result is intended to be forwarded near-instantaneously. An operation mode is also possible in which the identification sequence assigned to the control signal temporally precedes the control signal and announces the latter. This operation mode is particularly advantageous if the control signal is intended to be used to start an action, for example the start of a data recording. The operation mode (and hence the temporal assignment of control signals and identification sequences) can itself be defined by an identification sequence, i.e., be negotiated between the laser scanner 10 and the external device 23 (generally the bus subscribers). The negotiated operation mode may be defined beforehand for a set of events, or the identification sequence contains explanations concerning the (preceding or succeeding) control signal.

In the exemplary embodiment, the base 14 is mounted on a carriage 27, and the external device 23 serves for path detection of the carriage 27, for example by means of detection of the wheel positions. This arrangement of carriage 27 and laser scanner 10 mounted thereon is used for tunnel inspection or road mapping. The rotational movement of the measuring head 12 and the linear movement of the carriage 27 produce a helical scanning. By means of the interface 20, the data of the external device 23, that is to say the path detection of the carriage 27, and the data of the laser scanner 10 can be synchronized and if appropriate calibrated.

However, the external device 23 can also be any other device which supplies data which are intended to be synchronized expediently with the data of the laser scanner 10.

The invention claimed is:

1. A laser scanner, comprising:
an interface for communication between an internal device and an external device, wherein the interface comprises a bus having two bus lines (CANH, CANL) for bidirectional data transfer and at least a first control line (SYNC_IN) by which a control signal is transferred from the external device to the internal device, and wherein the laser scanner is provided as the internal device, the interface being assigned to the internal device.

2. The laser scanner of claim 1, wherein the two bus lines (CANH, CANL) are part of a CAN bus.

3. The laser scanner of claim 1, wherein the bus further comprises a second control line (SYNC_OUT) by which a control signal is transferred from the internal device to the external device.

4. The laser scanner of claim 1, wherein the first and second control lines (SYNC_IN, SYNC_OUT) provide for unidirectional data transfer.

5. The laser scanner of claim 1, wherein the internal device picks up the control signal transferred by the first control line (SYNC_IN) into its data stream and stores it with the data stream.

6. The laser scanner of claim 3, wherein the control signal on one of the first and second control lines (SYNC_IN, SYNC_OUT) is assigned an identification sequence on the two bus lines (CANH, CANL), wherein the identification sequence contains information as to what event the control signal represents, and wherein the identification sequence is temporally offset with respect to the control signal.

7. The laser scanner of claim 6, wherein the internal device picks up the identification sequence transferred by the two bus lines (CANH, CANL) into its data stream and stores it with the data stream.

8. The laser scanner of claim 6, wherein an operation mode that defines a temporal assignment between the control signals and the identification sequences is transferred by the two bus lines (CANH, CANL).

9. The laser scanner of claim 6, wherein the interface further comprises a power supply line (VCC) and/or a ground (GND).

10. The laser scanner of claim 6, wherein the external device with which the interface communicates is assigned to a carriage on which the laser scanner is mounted.

* * * * *